Figure 1:
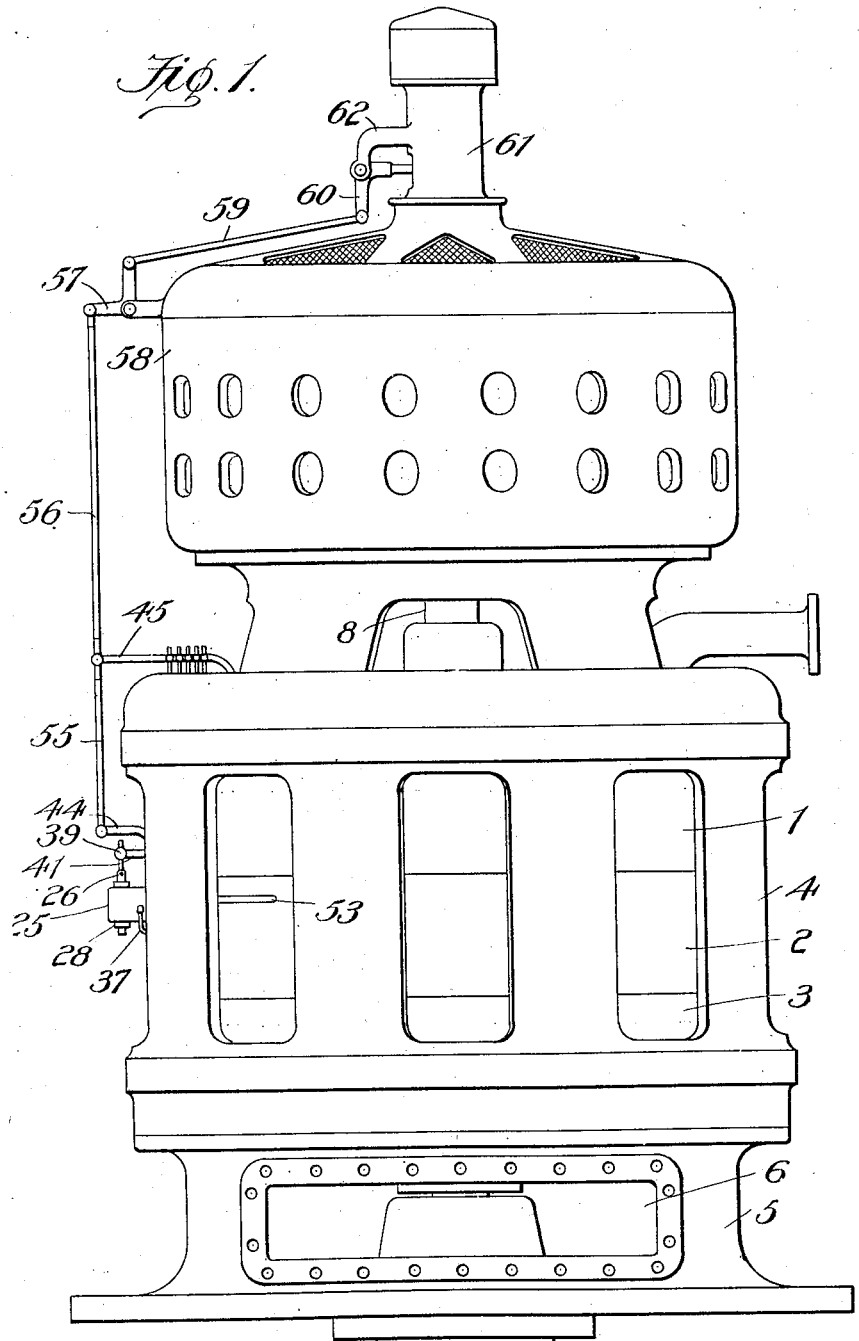

No. 814,756. PATENTED MAR. 13, 1906.
J. WILKINSON.
CONTROLLER MECHANISM FOR TURBINES.
APPLICATION FILED JAN. 20, 1905.

4 SHEETS—SHEET 1.

WITNESSES:
Edwin L. Bradford
P. H. Burch

INVENTOR
James Wilkinson
BY
Robt. D. Johnston Jr.
ATTORNEY

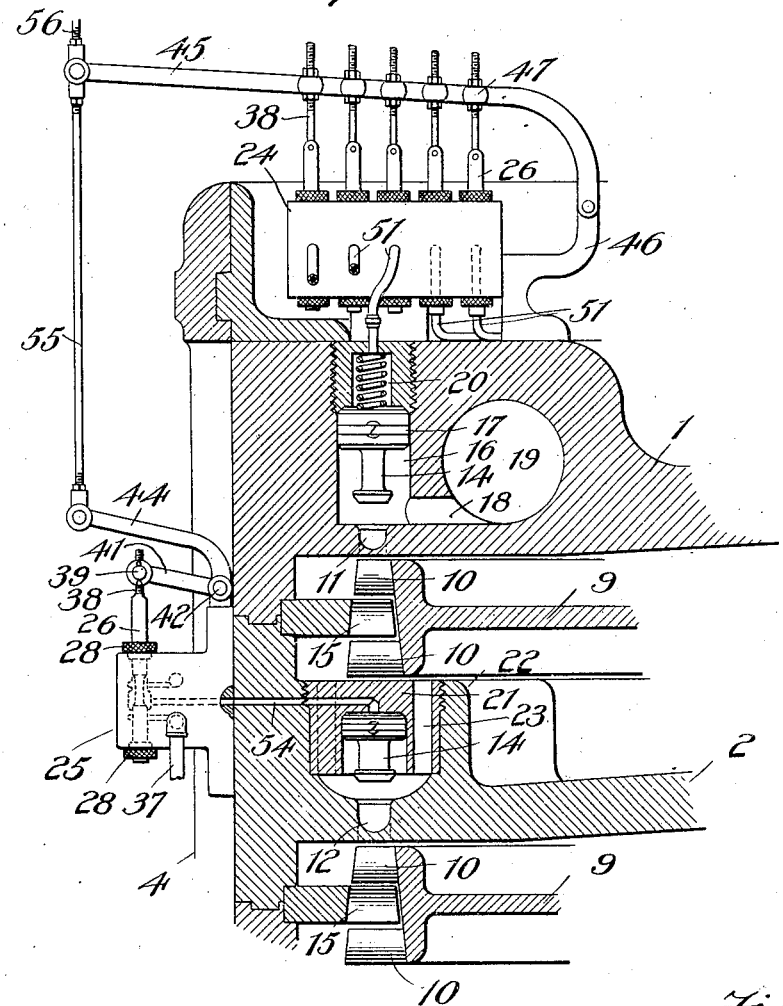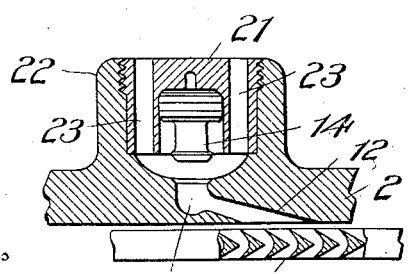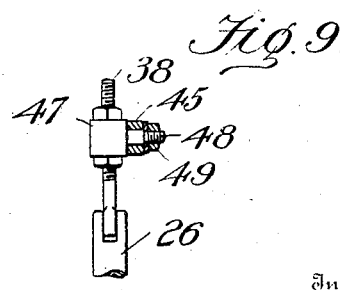

No. 814,756. PATENTED MAR. 13, 1906.
J. WILKINSON.
CONTROLLER MECHANISM FOR TURBINES.
APPLICATION FILED JAN. 20, 1905.
4 SHEETS—SHEET 3.
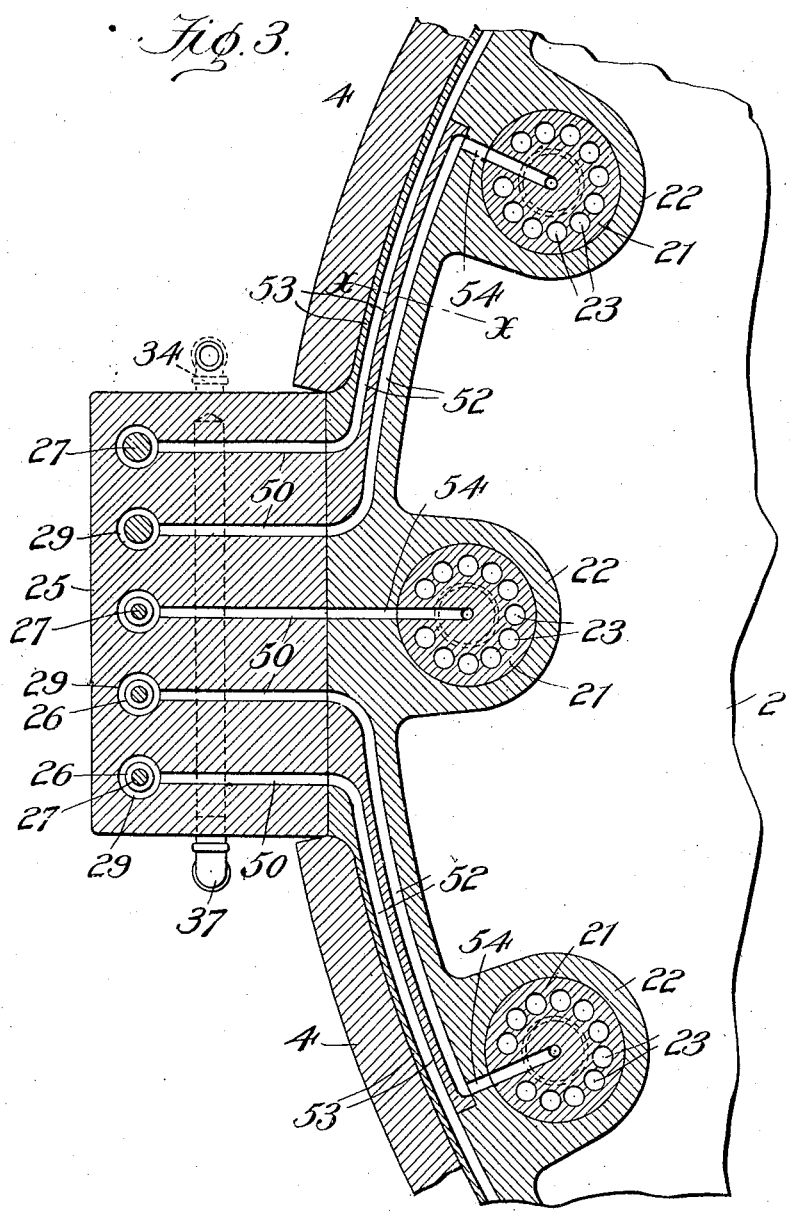
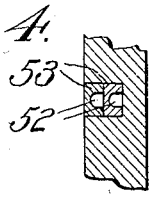
WITNESSES:
Edwin L. Bradford
P. H. Burch
INVENTOR
James Wilkinson
BY
Philip D. Johnston Jr.
ATTORNEY No. 814,756. PATENTED MAR. 13, 1906.
J. WILKINSON.
CONTROLLER MECHANISM FOR TURBINES.
APPLICATION FILED JAN. 20, 1905.
4 SHEETS—SHEET 4.
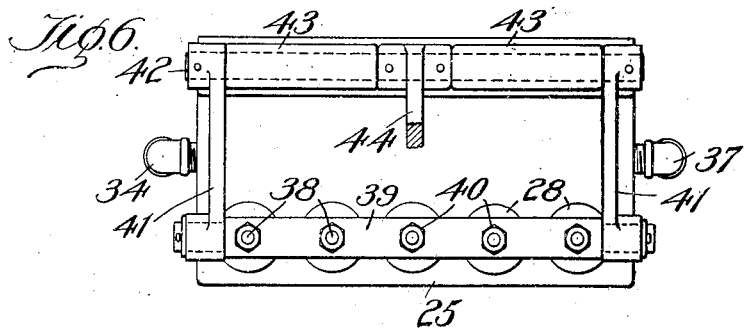
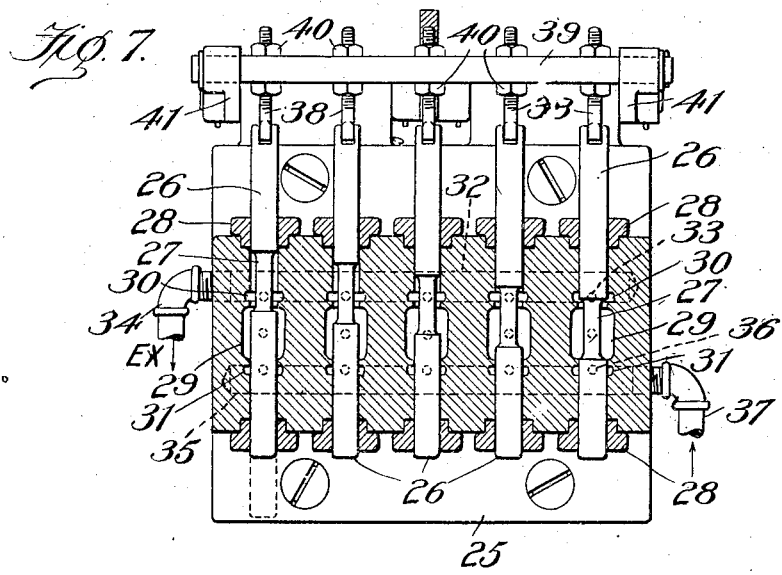
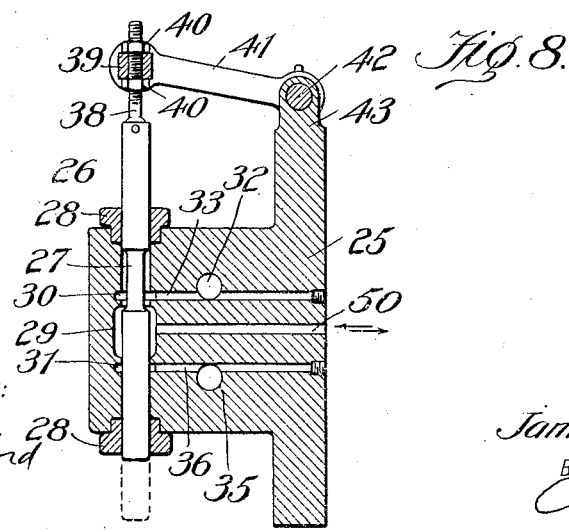
WITNESSES:
Edwin L. Bradford
P. H. Burch
INVENTOR
James Wilkinson
BY
Robt. D. Johnston Jr.
ATTORNEY

UNITED STATES PATENT OFFICE.

JAMES WILKINSON, OF BIRMINGHAM, ALABAMA, ASSIGNOR TO WILKINSON TURBINE COMPANY, A CORPORATION OF ALABAMA.

CONTROLLER MECHANISM FOR TURBINES.

No. 814,756.   Specification of Letters Patent.   Patented March 13, 1906.

Application filed January 20, 1905. Serial No. 241,971.

*To all whom it may concern:*

Be it known that I, JAMES WILKINSON, a citizen of the United States, residing at Birmingham, in the county of Jefferson and State of Alabama, have invented new and useful Improvements in Controller Mechanism for Turbines, of which the following is a specification.

My invention relates to elastic-fluid turbines, and has for its object to provide an improved governing mechanism which will effect in a simple and comparatively inexpensive manner the successive operation of a plurality of turbine-valves, which means may be actuated by a speed-governor or any other type of governor or by hand, as may be desired.

In its broadest aspect my invention comprises a number of reciprocatory valves, moved by a common actuator and so designed or connected to said actuator as to act in succession to effect the closing or opening of the ports or passages or nozzles under their control. For turbines of small powers the valves operated by a common actuator may serve to directly open and close the motor-fluid-supply nozzles or passages, and it is my intention to cover this adaptation of my invention in connection with its illustrated form, wherein the several valves constitute secondary or relay controller-valves, which by fluid-pressure means effect the operation of the turbine-nozzle valves.

More specifically, my present invention comprises a plurality of reciprocatory slide-valves which are shown of different conformation and adjustably connected to an actuator-bar which gives them a synchronous and substantially equal travel, throughout which they act in succession to open ports which admit controller fluid-pressure to motors for operating turbine-valves. Though the valves are shown of relatively different conformation, it is obvious that they may be adapted to produce the same successive governing action even where they are all similar in construction by adjustably connecting them to the actuator-bar, so that they may be set at different distances from the actuator-rod, and such a construction is intended to be covered by this application. The valves may be made to open or cause to be opened the ports or nozzles which they control simultaneously or in groups successively or at any desired time interval relative to the travel of the actuator-bar.

As a further adaptation of my invention to a multiple-stage turbine I may provide a separate set of valves and an actuator-bar therefor to control the admission of motor fluid to each stage, and these several actuator-bars may be connected up so that they can be moved simultaneously by a governor or by hand or independently, as may be desired. According to this arrangement any desired relative operation of the valves for the successive stages may be effected by the proper arrangement or construction of the several sets of valves or the connections between actuator-bars, and I am enabled to secure not only an independent control of the supply of motor-fluid to each stage, but also a simultaneous control of the working passage for the motor fluid across stages by means of which I may vary the working passage to produce different speeds in accordance with the principles set out in Letters Patent No. 766,922 issued to me August 9, 1904. The valves may be arranged in one or more sets for each stage, and the actuator-bars for each set may be connected up in any desired manner or independently operated, or, if desired, the controller-valves for the supply-valves may also control the operation of the stage-valves in any desired manner.

My invention further comprises the construction and arrangement of parts more fully described and claimed hereinafter and illustrated in the accompanying drawings, wherein is shown a preferred embodiment of my invention as applied to a multiple-stage turbine of large power.

Figure 1 of the drawings illustrates a side elevation of a vertical two-stage turbine driving an electric generator and provided with a governor-actuated valve-controlling mechanism in accordance with a preferred form of my invention. Fig. 2 is a partial vertical sectional view of the turbine, shown enlarged and illustrating a working-passage across stages with the controlling devices therefor. Fig. 3 is a partial plan view of a diaphragm, illustrating a fluid-pressure-controlling means for the stage-valves. Fig. 4 is a section along the line $x\ x$, Fig. 2, illustrating the construction of conduits for the controller fluid-pressure. Fig. 5 is a vertical sectional view of a stage-nozzle, taken longitudinally of the nozzle-passage, which here coöperates with a single row of buckets. Figs. 6, 7, and 8 represent, respectively, a top plan view and vertical sectional views taken along longitudinal and transverse planes through the stage-valve-controller casing. Fig. 9 is a detail view of the connection between a controller-valve for the initial stage and its actuating-lever.

Similar reference-numerals refer to similar parts throughout the drawings.

I have illustrated my invention applied to a compound impact-turbine of the vertical type having a supply-head 1, a diaphragm-partition 2, and an exhaust-head 3, all of which are peripherally flanged and interlock to form the inner casing of the turbine. These parts are held in place by an inclosing frame 4, having suitable abutments which engage the head-sections, one of the abutments being detachable. This frame is mounted upon an exhaust-casing 5, having a port 6 leading to the atmosphere or condenser and having connected thereto a bearing-box 7, within which the vertical shaft 8 of the turbine is mounted and preferably floated upon oil under high pressure. A bucket-wheel or rotor 9 is disposed within each stage-compartment of the turbine and keyed to shaft 8, having peripheral buckets 10 arranged in one or more parallel rows and disposed in alinement with the supply-nozzles 11 and the stage-nozzles 12. The admission of motor fluid to the bowls 13 of these nozzles is controlled by piston-actuated puppet-valves 14. When two or more rows of buckets are carried by each bucket-wheel, a row of stationary intermediates 15, as shown in Fig. 2, will be disposed between the rows of revolving buckets in each stage, the intermediates being formed and secured in position in any desired manner.

The supply-valves are disposed in chambers 16 in the supply-head, which serve as cylinders for the valve-actuating pistons 17. By-passages 18 admit pressure from the supply-passage 19 to these several chambers below pistons 17, and therefore tend to open the valves against the springs 20, seated against the screw-plugs which close the upper ends of the chambers. The cylinders for the piston-actuated stage-valves are formed in plugs 21, threaded into chambers formed in shoulders 22, disposed around the upper periphery of the diaphragm. The motor fluid from the first stage enters the valve-chambers formed in the shoulders beneath the plugs 21 through a plurality of passages 23, formed in the plugs, in which the piston-cylinders are also formed by chambers opening into the valve-chambers. The pressure in the stage-valve chambers acts against the valve-pistons and tends to open the stage-valves 12. I preferably mount the stage-valves in shoulders, as shown, as I consider that the latter will strengthen the diaphragm without materially increasing its weight. Heretofore I have illustrated diaphragms with annular peripheral shoulders. It is, however, to be understood that the valve and turbine construction may be varied, as it does not form an essential part of my present invention, which relates more particularly to an improved mechanism for controlling the operation of turbine-valves generally.

My controller mechanism comprises a supply-valve-controller casing 24, mounted upon the head 1, and a stage-valve-controller casing 25, connected by screws to the inner turbine-casing, the outer frame having ample strength in its webs to withstand all internal pressure strain. The controller-casings, differing only in the arrangement of the actuator-bars, can both be described by reference to Figs. 6 to 8. I have here illustrated five slide-valves 26 for each casing, which are preferably cylindrical in form and provided with a reduced intermediate portion 27. I provide the casings with a valve-chamber for each valve, which chambers as a preferred construction lead entirely through that part of the casings which serves as a compound valve-chest. The valves when in position extend through the valve-chests, being surrounded by suitable packing-glands 28, which are preferably screwed into the enlarged ends of each valve-chamber. Each valve-chamber is enlarged at or near its central portion to form what I term a "pressure-controller" chamber 29 and is also enlarged at points above and below the said controller-chamber to form a low-pressure chamber 30 and a high-pressure chamber 31 on each side of the controller-chamber. An exhaust-passage 32 leads longitudinally through each casing and communicates through by-passages 33 with each low-pressure chamber 30, a pipe 34 conducting the exhaust fluid to the atmosphere or condenser or to any other point where it may be further utilized, if desired. In a similar manner a passage 35 supplies fluid-pressure admitted by a supply-pipe 37 from any suitable source to the pressure-chambers 31 through by-passages 36. The valves are so constructed that without at any time establishing a direct communication between their respective high and low pressure chambers 30 and 31 they act to maintain one or the other of said chambers in communication with their pressure-controller chambers 29. Thus either a high pressure is admitted to the latter chambers or pressure is exhausted therefrom, the reduced portion of the valve being designed to cut off the exhaust as it admits pressure, and vice versa. In other words, as the upper body portion of a valve opens the port between chambers 29 and 30 the lower body portion closes the port between the former chamber and chamber 31. For the purpose of balancing the valves these several chambers are made circular. Obviously the continued travel of the valves after exposing their respective controller-chambers to a high or exhaust pressure will have no effect, since their controlling function is completed after they have by opening one or the other of the pressure-ports established a high or exhaust pressure in their controller-chambers. The purpose of this extended travel of the valves after performing their controlling function is to provide a means whereby a number of valves may be moved by a common actuator so that they act in succession without requiring the use of cam or lost-motion operating connections or separate operating devices for each valve. This successive or variable valve action may be obtained by the use of a group of valves of different conformation, their reduced portions 27 being at relatively different distances from their lower ends, so that as the valves are moved downwardly together they will act in succession to establish a high pressure in their respective controller-chambers and as they are raised to successively exhaust the pressure from these chambers. In the drawings I have combined these two arrangements, the controller-valves 26 for the stage-valves being shown in Fig. 7 with their reduced portions stepped and also swivelly connected to threaded eyebolts 38, which pass through a common actuator-bar 39, being connected thereto by a pair of nuts 40. By turning the valves to the right or left they may be set at any desired adjustment relative to their actuator-bar 39, which is journaled in two crank-arms 41, keyed to a rock-shaft 42, mounted in two lugs or ears 43, carried by the controller-casing. A lever 44 for moving the actuator-bar 39 through these connections is keyed to the shaft near its center. The valves controlling the turbine-supply valves are connected direct to the curved actuating-lever 45, which is swivelly connected to a standard 46, mounted upon the supply-head 1. In this latter instance the eyebolts 38 are connected to swivel-heads 47, having integral studs 48, which pass through the openings in the side of the lever 45 and are held in place thereon by nuts 49. It is evident that according to this latter arrangement the lever to which the valves are connected will give them a relatively varying travel; but this is comparatively small and may be either utilized or offset, according to the adjustment or construction of the valves.

To utilize the pressure in the several controller-chambers 29 to control the operation of the valves, I provide passages 50, leading from said chambers to the side of the controller-casing, where in the case of the supply-valves they connect with pipes 51, which lead around the head to the upper ends of one or more of the chambers 16. When the high pressure is introduced above the supply-valve pistons and the valves are substantially balanced, the springs 20 will then seat each valve. In the case of the stage-valves the passages 50 register with the conduits 52, formed in the outer periphery of the diaphragm, in the manner shown in Figs. 3 and 4, channeled strips 53 being inserted one above the other in two grooves. The channels in these strips register with the passages 50 and also with passages 54, bored inwardly through the shoulders in the diaphragm and the screw-plugs 21 therein and entering the upper beveled ends of the stage-valve cylinders. The controller-pressure will be superior to the stage-pressure below the valves, and they will close without the use of springs. As shown, one of these passages 50 communicates directly with a passage 54, and it will be noted that the several strips lead in opposite directions around the diaphragm. As many of these strips may be inserted in the grooves as desired, and also each channel thus formed may communicate with one or more valve-cylinders, or it may communicate with cylinders for succeeding stage-cylinders in the manner shown in my Letters Patent No. 761,866. If desired, the pipes 51 for the supply-valves may be dispensed with and channels formed in the supply-head in the manner shown in my Letters Patent aforesaid. It will be understood, however, that communication between the several controller-chambers and the several cylinders for the turbine-valves may be effected in any desired manner, that shown being merely a preferred construction.

The lever-arms 44 and 45, controlling the operation for the sets of supply and stage controller-valves, are shown swivelly connected to each other by a link 55 and by a link 56 to a bell-crank lever 57, mounted on the generator-casing 58. This lever by means of a link 59 is connected to a lever 60, which is connected to and operated by any desired form of speed-governor driven from the turbine-shaft. The governor is disposed within the casing 61, and the lever 60 is pivotally connected to a stud 62, integral with said casing. According to this arrangement the actuators for the valves controlling both the supply and stage valves will be simultaneously moved by a common governor. To secure any desired relative action of the supply and stage valves, I have shown the link 55 connecting the outer ends of their actuator-levers as an adjustable connection. It is obvious, however, that these levers may be independently operated by hand or by fluid-pressure under the control of a governor.

It is also contemplated in my present invention that a single set of valves may by suitable conduits control all of the turbine-valves for the several stages and also that the supply-valves for the first or succeeding stages may be separated into different groups having independent actuators and also that by disconnecting link 55 the governor may be utilized to control the supply to the turbine, while the flow of fluid between stages is manually controlled. It is further contemplated in my present invention to increase the number of stages and to use bucket-wheels, as shown in Fig. 5, in which case I may use a separate controller-casing for each stage, or I may adapt a stage-controller mechanism to actuate the valves across stages in any desired manner. It is also contemplated that the stage-controller mechanism will control only a part of the stage-valves, if such be desired.

Having thus described my invention, what I claim as new, and desire to protect by Letters Patent, is—

1. In a governing mechanism for turbines, the combination of a number of fluid-controlled valves for varying the flow of motor fluid through nozzle-passages against rotatable elements, a number of secondary valves operating on the controller fluid for said nozzle-valves to open or close them, and a common actuator for said secondary valves which brings them successively into position where they effect the opening or closing of said nozzle valve or valves under their control.

2. In a governing mechanism for turbines, the combination of a number of valves for varying the flow of motor fluid through independent nozzle-passages, fluid-motors for operating said valves, separate conduits for admitting controller fluid to said motors, separate valves controlling the admission of fluid to said conduits, and a governor-shifted actuator common to a group of said latter valves and adapted to move them so as to effect a successive opening or closing of said nozzle-valves.

3. In a governing mechanism for turbines, a number of nozzles through which motor fluid flows against rotatable elements, separate piston-actuated valves for said nozzle-passages, cylinders for said pistons to which the motor fluid is admitted and acts on said pistons to open said valves, conduits to admit an opposing fluid-pressure to said cylinders, secondary valves controlling the admission of fluid to said conduits, and a governor-shifted actuator common to a group of said secondary valves and adapted to move them so as to successively admit or exhaust fluid from said conduits.

4. In a controller mechanism for a turbine, the combination of a plurality of valves controlling the flow of motor fluid through the turbine, rotatable buckets driven by said motor fluid, and a common actuator to which said valves are swivelly connected, substantially as described.

5. In a controller mechanism for a turbine, the combination of a plurality of fluid-actuated valves controlling the flow of motor fluid through nozzle-passages, a plurality of secondary valves which control by fluid-pressure means the operation of said nozzle-valves, and a common actuator for said secondary valves which are of relatively different conformation, as and for the purposes described.

6. In a controller mechanism for a turbine, the combination of a plurality of controller-valves, a traveling member to which said valves are directly connected and by means of which they are simultaneously moved and ports for said valves which are opened at different times during a synchronous movement of the valves, the opening and closing of said ports effecting by fluid-pressure means the opening and closing of turbine-nozzles, substantially as described.

7. In a controller mechanism for turbines, a plurality of nozzles, piston-operated valves therefor, and a controlling mechanism for said valves comprising a group of secondary valves, conduits adapted to be successively opened and closed by said valves which admit an actuating fluid to the piston-operated valves, and a governor-shifted actuator to which a group of said secondary valves are adjustably connected and by means of which they are moved synchronously and brought successively into position where they open or close the conduits under their control.

8. In a controller mechanism for turbines, the combination of a plurality of fluid-controlled nozzle-valves for varying the admission of motor fluid to the turbine, a plurality of slide-valves of relatively varying conformation, an actuator to which said slide-valves are adjustably connected, and means to move said slide-valves to effect, by fluid-pressure under their control, the opening and closing of turbine-nozzle valves.

9. In a controller mechanism for a turbine, a controller-casing comprising a plurality of valve-chambers, a plurality of controller-valves adapted to successively admit a high or low pressure to said chambers, valves controlling turbine-nozzles which are opened and closed under the control of the pressure in said chambers, and an actuator device by which all or a group of said controller-valves are connected and synchronously moved, said valves being adapted to open and close their respective ports in any desired manner.

10. In a controller mechanism for a turbine, a plurality of supply-nozzles for a wheel-compartment, valve means to open and close said nozzles, and a set of secondary valves controlling said valve means, a pivoted actuator member to which said secondary valves are pivotally connected, substantially as described.

11. In a controller mechanism for a turbine having a plurality of supply-valves, a plurality of secondary valves controlling said supply-valves, an actuator member for said secondary valves, and means to swivelly connect said secondary valves to said actuator member, substantially as described.

12. In a controller mechanism for a turbine, a plurality of valves for controlling the flow of motor fluid through nozzle-passages, an actuator-bar for said valves, and means to swivelly and adjustably connect each of said valves to said bar, substantially as described.

13. In a controller mechanism for a turbine, the combination of a plurality of valves controlling the flow of motor fluid through nozzle-passages, an actuator-bar for a number of said valves, eyebolts to which said valves are pivotally connected, and means to adjustably connect said eyebolts to said actuator-bar.

14. In a controller mechanism for a turbine, a number of secondary controller-valves utilizing a relay power to actuate turbine-valves, a controller-casing for said secondary valves, a chamber for each valve, and ports which are opened and closed by said valves for admitting to said chamber a high or exhaust pressure, conduits to communicate said chamber-pressure to control the operation of the turbine-valves, and a common actuator by which a number of said secondary valves are simultaneously adjusted, substantially as described.

15. In a controller mechanism for a turbine, a controller-casing comprising a plurality of valve-chambers, ports for admitting a high and a low pressure to said chamber, and slide-valves having reduced portions which act to maintain one or the other of said ports open, said valves being adapted to continue their movement after opening one of said ports without further effect, and means to control the operation of said secondary valves.

16. In a controller mechanism for a turbine, a controller-casing, a plurality of elongated valve-chambers therein, ports to admit a high and a low pressure to said chambers, elongated slide-valves in said chambers which perform their controlling function of opening or closing one or the other of said ports during a fractional part of their total travel, passages leading from said chambers and conducting a high or low pressure to control the operation of turbine-valves, and means to operate said secondary valves.

17. In a controller mechanism for turbines, a controller-casing, two passages leading longitudinally through said casing and communicating respectively with high and low pressures, a plurality of valve-chambers communicating by by-passages with each of said pressure-passages, said chambers being enlarged between said pressure-ports to form controller-chambers, slide-valves movable in said chambers and adapted to establish communication between their respective controller-chambers and one or the other of said ports, a common actuator for a plurality of said slide-valves and passages to conduct the controller-chamber pressure to effect the opening and closing of turbine-nozzles.

18. In a controller mechanism for turbines, a controller-casing having a plurality of valve-chambers leading entirely through the casing, slide-valves disposed in said chambers, packing means for said valves at each end of said chambers, said valves acting to control the admission of motor fluid to turbine-nozzles, and means to actuate said valves, substantially as described.

19. In a multiple-stage turbine, a plurality of controller-valves for the turbine-valves controlling the supply of motor fluid to each stage, a separate actuator for the controller-valves for each stage whereby said valves are moved together and substantially uniformly and act to effect a successive opening of the turbine-nozzles, means to move said actuators simultaneously to control the flow of fluid across stages, substantially as described.

20. In a controller mechanism for multiple-stage turbines, a group of controller-valves to regulate the admission of motor fluid to initial supply-nozzles, a common actuator for a group of said valves, a group of secondary valves controlling admission of motor fluid to a succeeding stage, a common actuator for a group of said valves, an adjustable connection between said actuators, and a governor for moving said actuators simultaneously.

21. In a multiple-stage turbine, a group of controller-valves for controlling admission of pressure to each stage, a separate actuator for a plurality of valves for each stage, a governor, and means to couple up said actuators to said governor.

22. In a multiple-stage turbine, an inner casing, an outer frame disposed about the inner casing to hold the same together, controller mechanism for the stage-valves disposed between webs of said frame and connected to said inner casing, one or more controller-valves in said casing acting to vary the volume of motor fluid flowing through the stage nozzle or nozzles, and means to actuate said valves.

In testimony whereof I have hereunto set my hand in presence of two subscribing witnesses.

JAMES WILKINSON.

Witnesses:
R. D. JOHNSTON,
NOMIE WELSH.